United States Patent [19]

Schultz et al.

[11] Patent Number: 5,159,315

[45] Date of Patent: Oct. 27, 1992

[54] COMMUNICATION SYSTEM WITH ENVIRONMENTAL CONDITION DETECTION CAPABILITY

[75] Inventors: Charles P. Schultz, Hialeah; Francis P. Malaspina, Ft. Pierce, both of Fla.

[73] Assignee: Motorola, Inc., Schaumburg, Ill.

[21] Appl. No.: 625,388

[22] Filed: Dec. 11, 1990

[51] Int. Cl.⁵ .............................................. G08B 19/00
[52] U.S. Cl. .................................. 340/539; 340/504; 340/628
[58] Field of Search ............... 340/500, 501, 502, 511, 340/527, 531, 539, 586, 588, 628, 825.06, 825.09, 825.69, 504, 529, 628, 539, 505

[56] References Cited

U.S. PATENT DOCUMENTS

| | | | |
|---|---|---|---|
| 4,189,720 | 2/1980 | Lott | 340/628 |
| 4,417,235 | 11/1983 | Del Grande | 340/628 |
| 4,476,706 | 10/1984 | Hadden et al. | 73/1 G |
| 4,560,978 | 12/1985 | Lemelson | 340/351 |
| 4,581,604 | 4/1986 | Kimura et al. | 340/505 |
| 4,665,385 | 5/1987 | Henderson | 340/539 |
| 4,692,750 | 9/1987 | Murakami et al. | 340/588 |
| 4,785,283 | 11/1988 | Yuchi | 340/511 |

*Primary Examiner*—Edward L. Coles, Sr.
*Assistant Examiner*—Jill Jackson
*Attorney, Agent, or Firm*—Pedro P. Hernandez; Daniel K. Nichols

[57] ABSTRACT

A communication system (200) includes a portable radio (100) which has environmental detection capabilities. The radio (100) upon detecting the presence of an environmental condition such as smoke above a predetermined threshold, transmits an information signal to a communication station (202). Once the signal is received by communication station (202), it is decoded and a message is annunciated. The communication station (202) can transmit a message to radio (100) in response to the information signal. Optionally, before radio (100) transmits an information signal to the communication station (202), it first determines if the environmental condition (e.g. smoke) has been detected for a predetermined period of time.

7 Claims, 2 Drawing Sheets

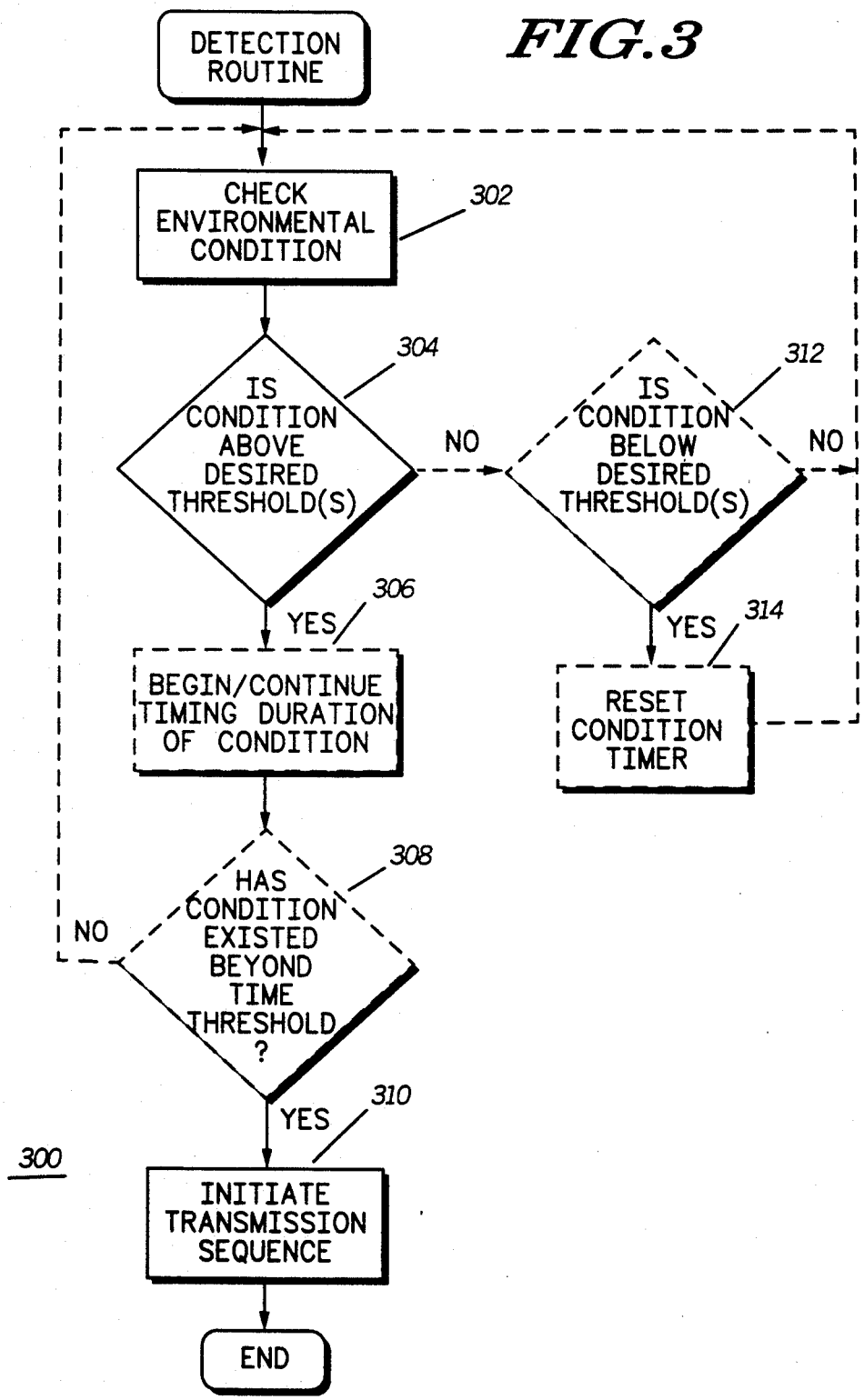

COMMUNICATION SYSTEM WITH ENVIRONMENTAL CONDITION DETECTION CAPABILITY

TECHNICAL FIELD

This invention relates to communication systems, and more specifically, to a communication system having a communication device with environmental condition detection capability.

BACKGROUND

Radio communication systems are well known in the communication art. In such systems, communication devices such as radios communicate with each other over radio frequencies. Radio communication systems allow people to communicate over long distances, while still allowing communication device users mobility.

Many users of communication systems especially portable communication device users work in hazardous environments. For example, firemen work in smoke-filled environments on a daily basis, and use portable radios in order to communicate with each other during a fire situation. Another example are chemical industry employees who work in or near gaseous environments which can sometimes be life-threatening.

A need exists for a communication system having communication devices which can detect the presence of dangerous environmental conditions such as smoke, dangerous gases, etc., and can automatically alert other communication devices of the condition.

Present day technology in the field of environmental condition protection has not addressed the need for protecting a user who is mobile, and who requires communication system supervision in case of a life threatening problem to the user. Presently, pocket sized portable alarms which can detect the presence of hazardous environmental levels are available, but they do not have the capabilities of transmitting the hazardous condition information to a central location for supervision and monitoring. Other presently available monitoring systems include "hard wired" systems which are part of computerized networks which allow for the environmental monitoring at fixed locations of a building. These systems tend to be expensive to install due to the wiring which is required in order to implement the system, and tend not to be flexible once the system is installed since this require rerouting of existing cables. These hard wired systems also tend to be difficult to expand due to the issues of interfacing to pre-existing cables.

SUMMARY OF THE INVENTION

Briefly, according to the invention, a communication device capable of detecting environmental conditions is disclosed. The communication device comprises a sensor means for determining an environmental condition level, and a comparison means for comparing the environmental condition level to a predetermined threshold level. The communication device also includes a transmitting means for transmitting an information signal when the environmental condition exceeds the threshold level, and a receiver means for receiving response signals form other communication devices.

A communication system which utilizes the communication device is also disclosed. The communication system comprises a first communication device capable of detecting an environmental condition level and transmitting an information signal when the environmental level exceeds a threshold level, and a second communication device which is capable of receiving information signals sent by the first communication device. The second communication device is also able to transmit response signals to the first communication device.

BRIEF DESCRIPTION OF THE DRAWINGS

FIG. 3 is a flow diagram illustrating how a normal communication sequence occurs in accordance with the present invention.

DETAILED DESCRIPTION OF THE PREFERRED EMBODIMENT

Figure 1:
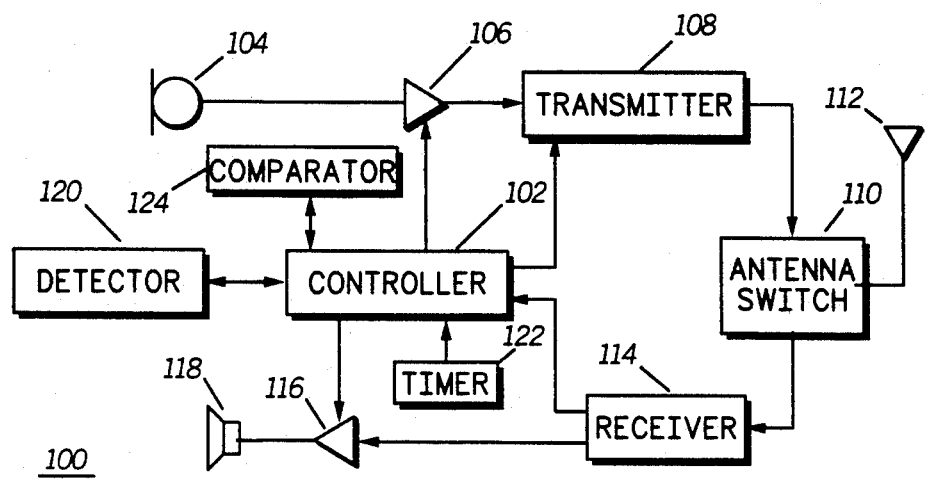
FIG. 1 is a block diagram of a communication device according to the present invention.

Referring to FIG. 1, a communication device 100 in accordance with the present invention is shown. The communication device, such as a portable radio 100, includes a sensor means such an environmental condition detector 120 which can sense the environmental condition level present, and send a corresponding signal to a controller 102. The environmental condition detector 120 can be anyone of a number of different environmental condition detectors/monitors available such as a; smoke detector, carbon-monoxide detector, methane gas detector, oxygen detector, hazardous/toxic gas detector, hazardous chemicals, or other types of environmental condition detectors. Any type of environmental condition level detectors can be utilized with the present invention. For portable communication applications a radio 100 which can detect environmental condition levels would be useful for use with FACTORY MUTUAL approved equipment, since a radio 100 which is FM approved has a greater probability of being in a hazardous environmental condition which might injure the radio user. In the preferred embodiment the detector 120 is a smoke detector which can be implemented using a conventional smoke detector IC such as a MC145010 photoelectric smoke detector manufactured by Motorola, Inc. The smoke detector IC is combined with a conventional infrared photoelectric chamber which is used to detect the scattering of light caused by the smoke. The detector 120 is connected to controller 102 which can be anyone of a number of microprocessors or microcontrollers commercially available, such as a MC68HC05C4 microcontroller, having on-chip memory, control circuitry, timer circuitry, and capable of interfacing to external memory storage devices if necessary. Preferably, the controller 102 has a software program stored inside the controller's memory section which acts as a comparison means 124 and samples the information from the detector 120 in order to determine if a hazardous condition (i.e. smoke) has occurred above a threshold level. A predetermined threshold level can be stored in controller's 102 memory. Once the detector 120 detects the hazardous condition, and it is over the predetermined threshold level, it sends a signal to controller 102, informing it that smoke has been detected. At that time controller 102 can send a message to a transmitter means such as transmitter 108 in order to transmit an information signal corresponding to the fact that smoke has been detected.

Optionally, the controller 102 can provide a timing means 122 in order to determine the period of time the environmental condition level (i.e. smoke, hazardous gas condition, low oxygen, etc.) is above the predetermined threshold level stored in the controller's 102 memory. By having stored in memory, a predetermined duration of time which the environmental condition level has to be above the given threshold level, one can avoid falsing or provide indication of exceeding the threshold level. For example, radio 100 would not send an information signal (smoke alarm signal) until the smoke condition was above a given threshold level, and the condition was above this level for a predetermined number of minutes. At which point the information signal would be transmitted by radio 100. The time limit could also be variable based on the level of the environmental condition detected. For example, if the level of a specific toxic gas is detected in a high concentration the time interval could be decreased. While if the concentration of the gas is very low, the time interval could be longer, since it might not cause any injury to the radio user at low levels.

Transmitter 108 is preferably, a conventional radio frequency transmitter as known in the art. Transmitter 108 is selectively coupled to antenna 112 via antenna switch 110, which switches the antenna 112 between the transmitter 108, and receiver 114. Besides transmitting an information signal that smoke is present, controller 102 can alert the communication device user via an annunciator means such as speaker 118. Controller 102 can send an alarm signal which gets amplified by amplifier 116 for presentation to speaker 118. This alarm feature can alert a communication device user that he is presently in a hazardous environment such as smoke, toxic gases, etc. This feature would be very beneficial to radio 100 users such as police officers who have been known to be injured or killed by carbon monoxide gases entering their police vehicles while they have been working inside their cars. Other types of annunciator means such as displays, LED's, etc. could also be added to radio 100 in order to provide more alerting means. One type of annunciator means which would be useful in mobile radio applications (i.e. vehicle mounted applications) is having an output signal line which changes states when the threshold level has been exceeded. This signal line could for example energize an external relay which could turn off the ignition in a vehicle whenever a toxic gas like carbon-monoxide where detected by radio 100.

Radio 100 can also transmit voice messages to other communication devices via microphone 104. Microphone 104 is coupled to amplifier 106, which is in turn coupled to transmitter 108 for final transmission.

The environmental object detector 120 is preferably found inside of radio 100 enclosed by the radio's housing. Alternatively, the detector could be separated from radio 100 by way of a conventional cable assembly, which would allow the detector 120 freedom of placement.

Communication device 100 also includes a receiving means which can take the form of a conventional radio frequency receiver 114. Receiver 114 can receive response signals which are transmitted by other communication devices. Depending on the communication protocol which is utilized by the communication devices, different types of information can be received and transmitted from communication device 100.

Figure 2:
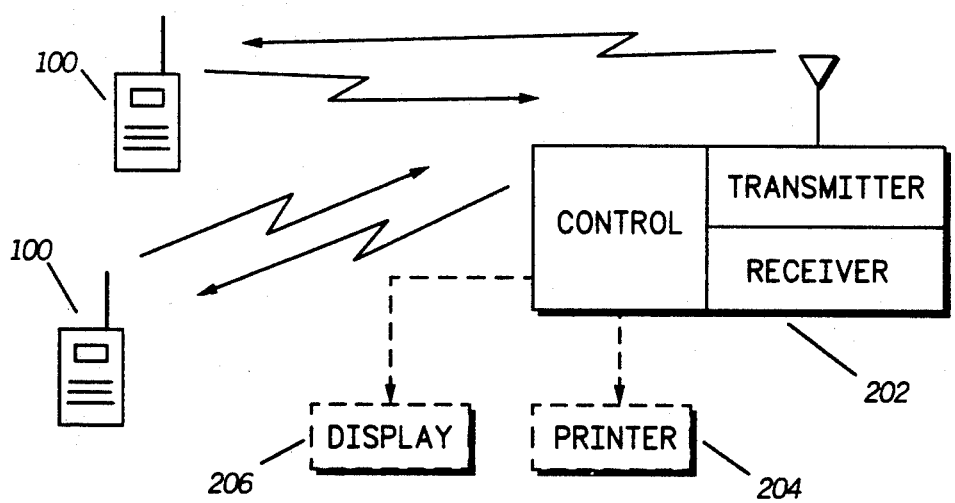
FIG. 2 is a drawing of a communication system in accordance with the present invention.

Referring to FIG. 2 a communication system 200 having environmental detection capabilities is shown. System 200 consists of a first communication device such as a radio(s) 100 having environmental detection capabilities. When information signals are transmitted by radios 100 that a hazardous condition has been detected, the signals are received by a second communication device, communication station 202. Communication station 202 is a conventional radio frequency station having a transmitter, receiver, and controller means. The transmitter and receiver means are preferably conventional radio frequency devices. The controller means can be any type of conventional computer or microcontroller known in the art. The controller means would preferably have a storage means for storing information that is received by the communication station 202. The station 202 has an annunciator means such as a speaker, or a display 206 for visual information. A printer 204 for hard copy outputs of information that has been received could also be part of the annunciator means of the station 202. Communication station 202 can be a station like that found in a trunked communication system such as a MOTOROLA SMARTNET TM central controller, or a conventional STAT-ALERT TM terminal both manufactured by Motorola, Inc. The system 200 could also be a digital communication system which transmits digital information between communication devices.

The job of the communication station 202, is to receive the information signals that are transmitted by radios 100 and decode the information signals as they arrive. The information signals would preferably have the radio ID of the radio sending the signal, a condition code which informs station 202 what type of environmental condition have been found by radios 100, and other types of similar system information. Once the information is decoded, station 202 can then store the information for later use, and then alert the station operator of any hazardous conditions present at anyone of the radios 100. The station operator can then transmit a response signal or voice message back to the radio operator in order to determine his condition. Besides communicating with the radio in question, station 202 can communicate with the other communication devices 100 that are part of the system in order to inform them of any emergency condition that may exist. Depending on the complexity of the communication protocol used by the system 200, many different types of information exchanges can occur between station 202, and radios 100. In a sophisticated communication system like a trunked radio system, the station operator 202 can reconfigure radios 100 to all go into an emergency channel whenever an emergency signal is sent by one of the radios 100. Station 202 could also after decoding the information signal sent by radio 100 could send a response signal back to the radio 100 which would make the radio start sounding an audible alarm. This feature would be helpful in a situation where a fireman had been overcome by smoke, and the triggering of the audible alarm would help in locating him. Station 202 can also communicate with radios 100 using conventional voice communications. Other advanced communication features such as over the air reprogramming of radios 100 after an environmental condition alarm has occurred can also be accomplished using more sophisticated protocols which are available.

FIG. 3 shows a flow diagram of a normal communication sequence which occurs when using the present invention. In step 302, radio 100 checks via detector 120 the environmental conditions present. It then in step 304 determines if the environmental condition level is above a certain threshold level preferably stored in memory in controller 102. If the presence of a condition like smoke is found, a timer inside of controller 102 is started in step 306. In step 308 the time the condition has been above is compared to a value also stored in memory in controller 102. If the condition has not been above the condition threshold for the predetermined period of time, the cycle is repeated and the radio again monitors the environmental conditions to see if the smoke is still present. If when returning to step 308 the condition has persisted above the predetermined duration, an information signal is generated by controller 102 which is then transmitted by transmitter 108, in step 310. In step 312, if the condition has fallen below the predetermined threshold, the internal timer is reset (step 314) in order to reset the radio, and restart the whole sequence. Station 202 can determine both the threshold level and predetermined period of time stored in radio 100 by transmitting a response signal to radio 100.

The environmental condition detection system 200 that has been described would be very beneficial for all types of environmental monitoring applications, by combining the benefits of radio communications with environmental sensor technologies. Besides alerting other communication devices such as a base station 202, the communication device 100 detecting the dangerous condition, could also warn the communication device user of the dangerous environmental condition he is in, in order to avoid injury.

While the present invention has been described with specific embodiments, it is evident that many alternatives, modifications and variations will be apparent to those skilled in the art in light of the foregoing description. Accordingly, it is intended that the present invention embrace all such alternatives, modifications, and variations as fall within the spirit and scope of the appended claims.

What is claimed is:
1. A communication device having environmental condition detection capabilities, comprising:
   a sensor means for determining the level of an environmental condition;
   a comparison means for comparing the environmental condition level to a threshold level;
   a timing means responsive to the comparison means for determining an amount of time the environmental condition level exceeds the threshold level;
   a transmitter means for transmitting an information signal to a second communication device when the amount of time the environmental condition level exceeds the threshold level is greater than a predetermined period of time, the information signal informing the second communication device of the environmental condition present at the first communication device; and
   a receiving means for receiving a response signal transmitted from the second communication device in response to the second communication device having received the information signal, the response signal causing an annunciator means which is coupled to the receiving means to produce an alarm signal.

2. A communication device as defined in claim 1, wherein the transmitter means is a radio frequency transmitter, and the receiver means is a radio frequency receiver.

3. A communication device as defined in claim 1, wherein the sensor means comprises a smoke detector.

4. A communication device as defined in claim 1, wherein the sensor means comprises a gas detector.

5. A communication device as defined in claim 1, wherein the annunciator means comprises a speaker.

6. A communication device as defined in claim 1, wherein the annunciator means comprises an output signal line and the alarm signal comprises a change of state in the output signal line.

7. The communication device of claim 1, wherein the annunciator means is a speaker, and the response signal causes the speaker to begin generating the alarm signal.

* * * * *